W. Z. BLACK AND D. W. BUTZ.
WHEEL.
APPLICATION FILED JULY 29, 1919.
1,390,871.
Patented Sept. 13, 1921.
3 SHEETS—SHEET 1.
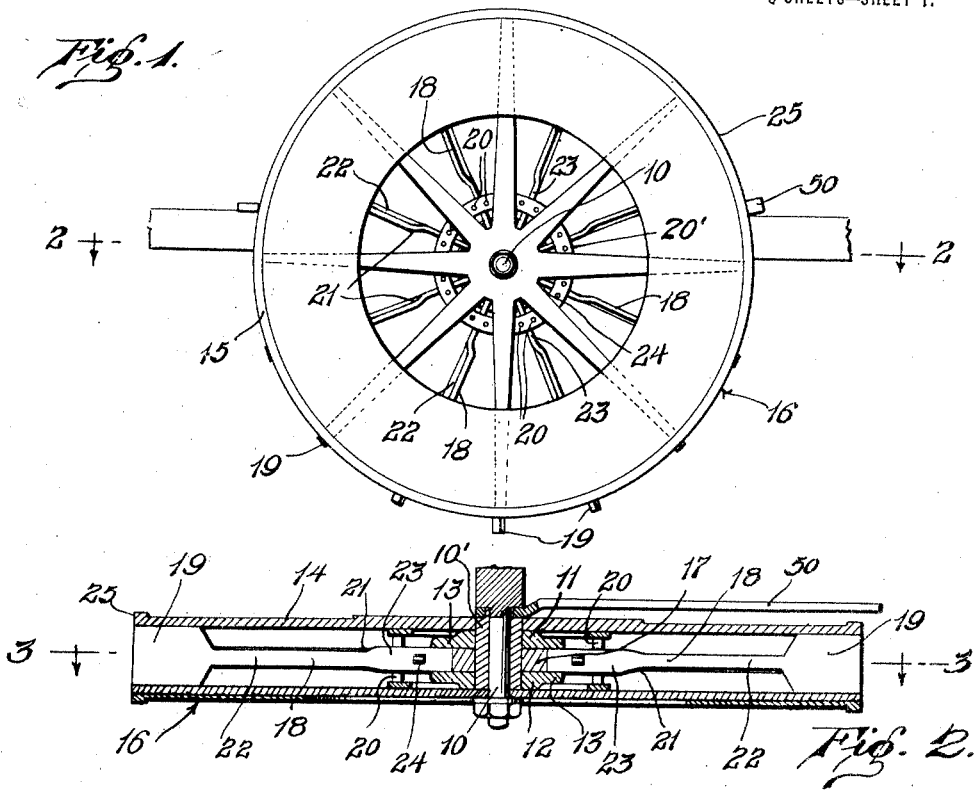
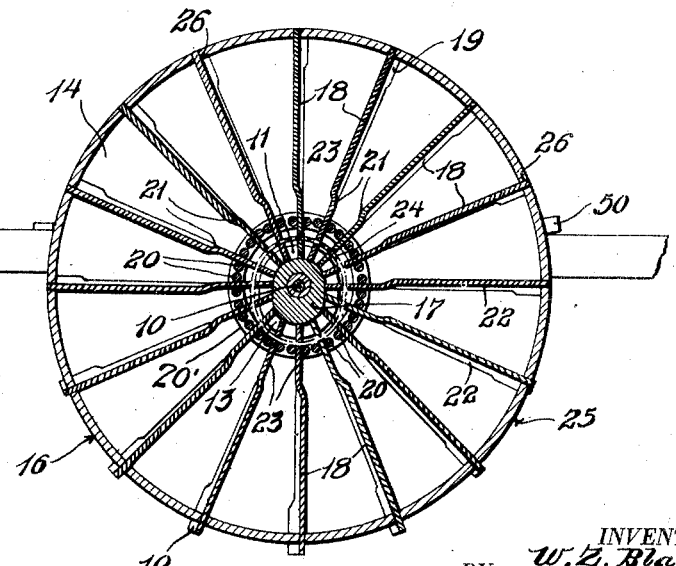
WITNESS:
INVENTORS
W. Z. Black
D. W. Butz
BY
Victor J. Evans
ATTORNEY.

W. Z. BLACK AND D. W. BUTZ.
WHEEL.
APPLICATION FILED JULY 29, 1919.
1,390,871.
Patented Sept. 13, 1921.
3 SHEETS—SHEET 2.
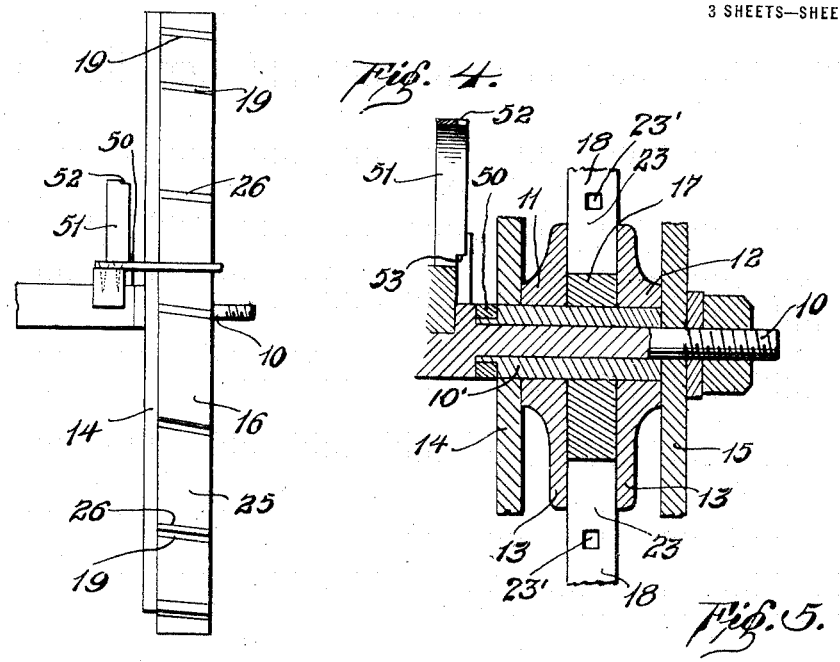
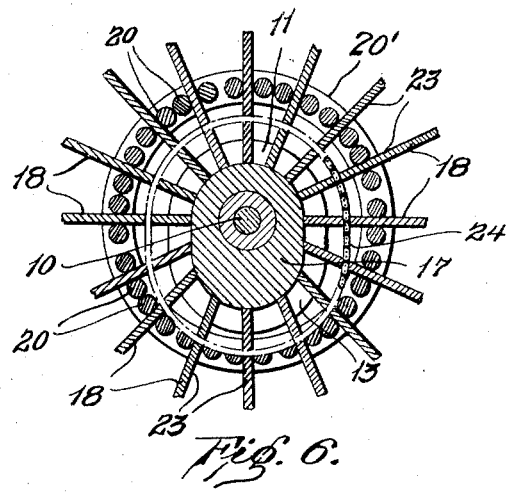
WITNESS:
INVENTORS
W. Z. Black
D. W. Butz
BY
Victor J. Evans
ATTORNEY.

W. Z. BLACK AND D. W. BUTZ.
WHEEL.
APPLICATION FILED JULY 29, 1919.

1,390,871.

Patented Sept. 13, 1921.
3 SHEETS—SHEET 3.

WITNESS:

INVENTORS
W. Z. Black
D. W. Butz
BY
Victor J. Evans
ATTORNEY.

UNITED STATES PATENT OFFICE.

WILLIAM Z. BLACK AND DELBERT W. BUTZ, OF KOKOMO, INDIANA.

WHEEL.

1,390,871.  Specification of Letters Patent.  Patented Sept. 13, 1921.

Application filed July 29, 1919. Serial No. 314,028.

*To all whom it may concern:*

Be it known that we, WILLIAM Z. BLACK and DELBERT W. BUTZ, citizens of the United States, residing at Kokomo, in the county of Howard and State of Indiana, have invented new and useful Improvements in Wheels, of which the following is a specification.

This invention has reference to improvements in tractor wheels.

The object of the invention is to produce a tractor wheel wherein the spurs or calks will be projected beyond the periphery of the wheel only at the portions thereof brought to ground contacting position, all of the spurs or calks being movable radially with respect to the wheel, passing through suitable openings in the rim thereof, and by virtue of such movement removing mud and dirt from said rim.

A further object of the invention is to provide a tractor wheel having calks movable through the periphery thereof which may be retracted and projected from other portions of the wheel, to provide a smooth bearing between the wheel and the surface on which the wheel travels, and consequently prevent the wheel inflicting injury to a smooth road bed when the vehicle is passing thereover.

A further object of the invention is to produce a tractor wheel having slidable calks and a scraper member being arranged on the periphery of the wheel to retain the same free of mud, dirt or other accumulations.

Other objects and advantages will present themselves as the nature of the invention is better understood, reference being had to the accompanying drawings, in which:

Figure 1 is a side elevation of a tractor wheel constructed in accordance with this invention.

Fig. 2 is a sectional view approximately on the line 2—2 of Fig. 1.

Fig. 3 is a transverse sectional view approximately on the line 3—3 of Fig. 2.

Fig. 4 is an end elevation with one of the side plates removed.

Fig. 5 is a greatly enlarged detail sectional view through the hub portion of the device.

Fig. 6 is a similar sectional view through the cam member.

Figure 7:
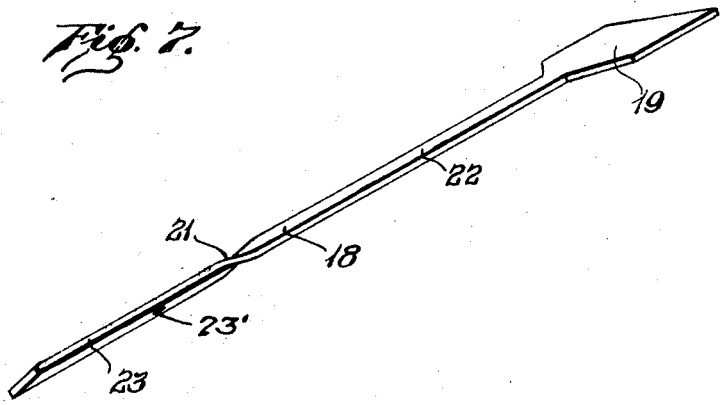
Fig. 7 is a perspective view of one of the calks and the integral arm therefor.

While our improvements are primarily devised as the propelling wheels of tractors, it is, of course, obvious that the same may be employed on other vehicles.

Referring now to the drawings in detail, the numeral 10 designates the spindle end of an ordinary vehicle axle. Surrounding the axle 10 is a sleeve 10'. Either integrally formed with the sleeve or secured to the center thereof is a cam 17. On the sleeve 10' there are eccentrically mounted disks 13 that contact with the opposite faces of the cam 17. The disks have their portions which surround the sleeve thickened, as at 11 and 12 respectively to provide outstanding bosses. When the improvement is attached to a revoluble axle the members 13 are secured thereto, but when the axle is stationary, as in the present instance, the disk members 13 have their bosses secured to the side members 14 and 15 of the tractor wheels 16. Disposed in contacting relation with the cam 17 are the inner ends of radially disposed arms 18. Each of the arms 18 is guided between pairs of anti-frictional rollers 20 journaled in suitable openings in rings 20' that are secured on the inner faces of the sides 14 and 15 of the wheel.

As illustrated, particularly in Fig. 7 of the drawings, it will be seen that each of the arms 18 is given a half twist, as at 21 to provide an angularly disposed end portion 23, and it is this portion that is in contacting engagement with the cam. The outer portion of each of the arms, indicated by the numeral 22 terminates in a widened end 19, the said widened portion providing calks which are guided through angularly disposed openings in the rim 25 of the wheel. The rim is removably secured between the side members of the wheel.

The inner ends 23 of each of the arms 18 are snugly received between the disks 13 and are each provided with a slot or opening 23'. Each of the openings 23' is disposed an equi-distance from the end of the arm that contacts with the cam, and passing through the openings in all of the arms there is a flexible member such as a chain 24.

By reference, especially to Fig. 4 of the drawings, it will be seen that the inner end of the sleeve 10' is reduced and is preferably square in cross section. This end is engaged by the socket end of a handle 50. It will be obvious that by turning the handle, the sleeve will be likewise turned, and consequently the cam will be turned with the sleeve to influence the arms 18 to bring certain of the calks on the ends of the said arms a determined distance outward through the openings or slots 26 in the periphery of the wheel. In accordance with the direction and degree to which the handle is manipulated, the calks may be projected to project beyond the under face of the wheel, the sides, or even the top thereof. Thus, when it is desired that traction between the wheel and the surface over which it travels is to be increased, the handle is manipulated to turn the cam to cause the lower arms to be moved and the calks on the outer ends thereof to be projected on to the ground surface, while, when the wheel is to travel over a surface without having its calks embedded therein, the lever is manipulated to bring the cam to another position. The chain 24 at all times influences the arms to bring the inner ends thereof into contacting engagement with the outer ends of the cam, and by twisting the arms as above described, the calks are arranged angularly with respect to the periphery of the wheel, so that a firmer bearing against the ground is thus provided than were the calks arranged at a right angle with respect to the periphery of the wheel.

Figure 8:
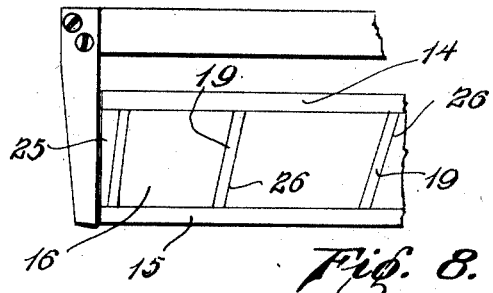
Fig. 8 is a fragmentary plan view of the wheel showing the scraper arranged thereon.
Figure 9:
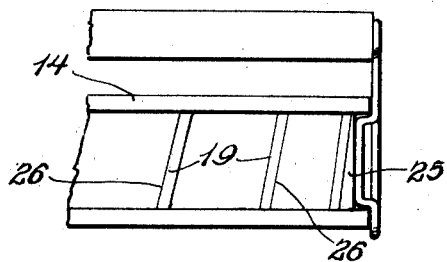
Fig. 9 is a similar view illustrating another form of scraper.

To keep the periphery of the wheel clean, I provide a scraper, one form of which being illustrated in Fig. 8 of the drawings, and being in the nature of a flat arm, while that illustrated in Fig. 9 is in the nature of a bent wire member which is desirable when the side members of the wheel project beyond the tread portion thereof. Both of the scrapers are indicated by the numeral 25.

On the frame of the vehicle there is a segmental rack 51. The rack has spaced notches 52 and 53 therein, and either of these notches is designed to receive the lever 50, in accordance with the position of the cam and in accordance with the directions in which the calks are projected through their openings in the periphery of the wheel, and it is thought that the foregoing description will fully set forth the construction of the improvement.

Having thus described the invention, what is claimed as new, is:—

1. In a tractor wheel, the combination with the spindle of an axle, of a sleeve mounted thereon, a cam secured to the sleeve, disks surrounding the sleeve and contacting with the opposite faces of the cam, said wheel including side members which contact with the disks, a rim providing the periphery of the wheel secured to the side members thereof, and said rim having transverse openings therethrough, arms having their outer ends widened to provide calks which latter are received in the referred to openings in the periphery of the wheel, and the inner ends of the arms contacting with the cam and disposed between the disks, a flexible element passing through all of the arms for holding the same in contacting engagement with the disk, anti-frictional guide means for each of the arms, and means for turning the sleeve on the axle spindle to arrange the cam at different relative positions with respect to the arms.

2. In combination with an axle spindle, of a traction wheel therefor including side plates and a rim providing the periphery of the wheel connected to said side plates, said rim having angularly arranged transversely disposed openings therethrough, a sleeve freely received in the wheel and surrounding the axle spindle, a cam member secured to the sleeve, disks eccentrically mounted on the sleeve and contacting with the opposite faces of the cam, and the side members of the wheel being secured to said disks, anti-frictional rollers arranged in spaced pairs between the side members of the wheel, an arm guided between each pair of said rollers and having its inner end contacting with the cam, each of said arms having an opening therethrough spaced an equi-distance from the inner end thereof, a continuous chain passing through said openings, said arms being twisted upon themselves to provide an angular extension which has its outer end widened to provide a calk, one of said calks being received in each of the angle openings in the periphery of the wheel, means connected with the sleeve arranged to one side of the wheel for revolving the sleeve and cam, means for holding the sleeve and cam when so positioned, and a scraper member for the wheel.

In testimony whereof we affix our signatures.

WILLIAM Z. BLACK.
DELBERT W. BUTZ.